April 24, 1951   R. V. CORNS   2,550,137
HYDRAULIC ACTUATING SYSTEM WITH AUTOMATIC FOLLOW-UP
Filed Aug. 15, 1947   2 Sheets-Sheet 1

ROBERT V. CORNS
INVENTOR

BY *Hubert V. Miller*

ATTORNEY

April 24, 1951 R. V. CORNS 2,550,137
HYDRAULIC ACTUATING SYSTEM WITH AUTOMATIC FOLLOW-UP
Filed Aug. 15, 1947 2 Sheets-Sheet 2
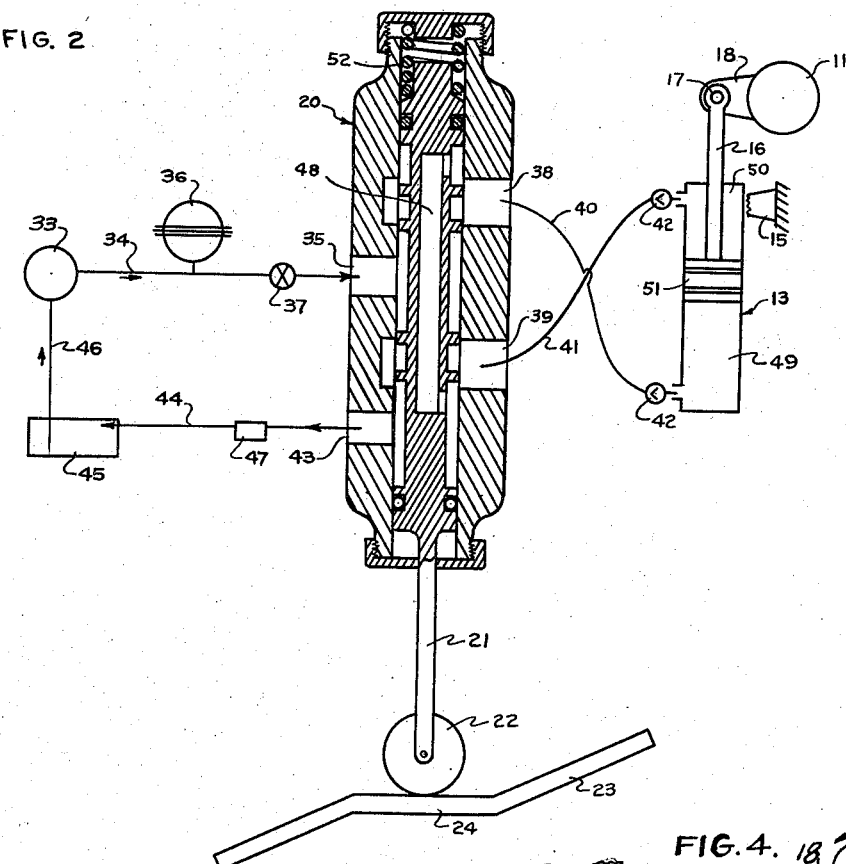
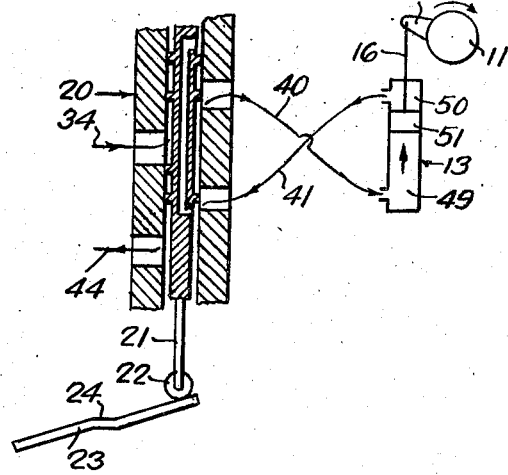
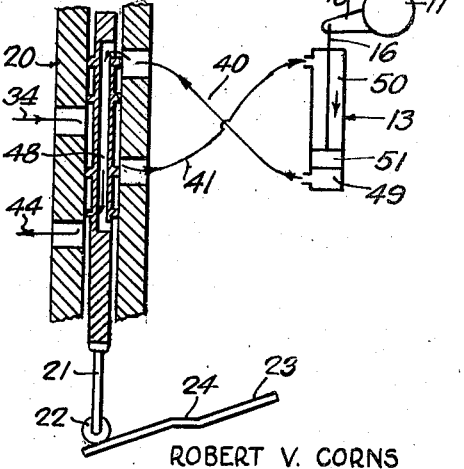
ROBERT V. CORNS
INVENTOR
BY Hubert Miller
ATTORNEY Patented Apr. 24, 1951

2,550,137

UNITED STATES PATENT OFFICE 2,550,137

HYDRAULIC ACTUATING SYSTEM WITH AUTOMATIC FOLLOW-UP

Robert V. Corns, Wichita, Kans., assignor to Boeing Airplane Company, Wichita Division, Wichita, Kans.

Application August 15, 1947, Serial No. 768,871

4 Claims. (Cl. 244—50)

This invention relates to an improved system for hydraulically actuating a movable member, device, or mechanism in a controlled manner and, while the invention will apply to hoists, jacks, machine tools, etc., it is herein illustrated and described as applied to steering mechanisms, more particularly for the steering of an airplane nosewheel.

An important object of the invention is to provide a novel means of controlling the effective stroke of an hydraulic actuator to insure that its stroke, and consequently the movement of the member to which it is operably connected, will be substantially proportional to the extent of movement of a manually operated control member.

Another important object is to provide a system of this type in which the hydraulic actuating cylinder or motor also serves to control undesirable high frequency movements of the member to be actuated, in this case the shimmy or high frequency oscillation of the ground contacting nosewheel.

Briefly, these objects are accomplished by operably connecting the member to be actuated to a reversible piston-type fluid motor which is under the control of a fluid flow control valve, the valve in turn being operable by a manually operated control member, and also by a cam carried by the member being actuated, whereby movement of the member to be actuated is initiated by movement of the manual control, and is arrested by the cam after the member being actuated has traveled the proportional distance selected by the manual control, there being no subsequent movement of the manual control necessary to arrest the movement of the member being actuated.

The construction and operation of a preferred embodiment of the invention, together with other objects, will be clearly understood when the following description is read in connection with the accompanying drawings, in which:

Figure 2 is a schematic view, with parts in section, of an entire hydraulic system embodying the invention, all parts being shown in their respective neutral positions;

Figure 3 is a view similar to Figure 2 but shows the various parts in their relative positions during a right turn; and Figure 4 is a view similar to Figure 3 but shows the parts in their relative positions during a left turn.

Figure 1:
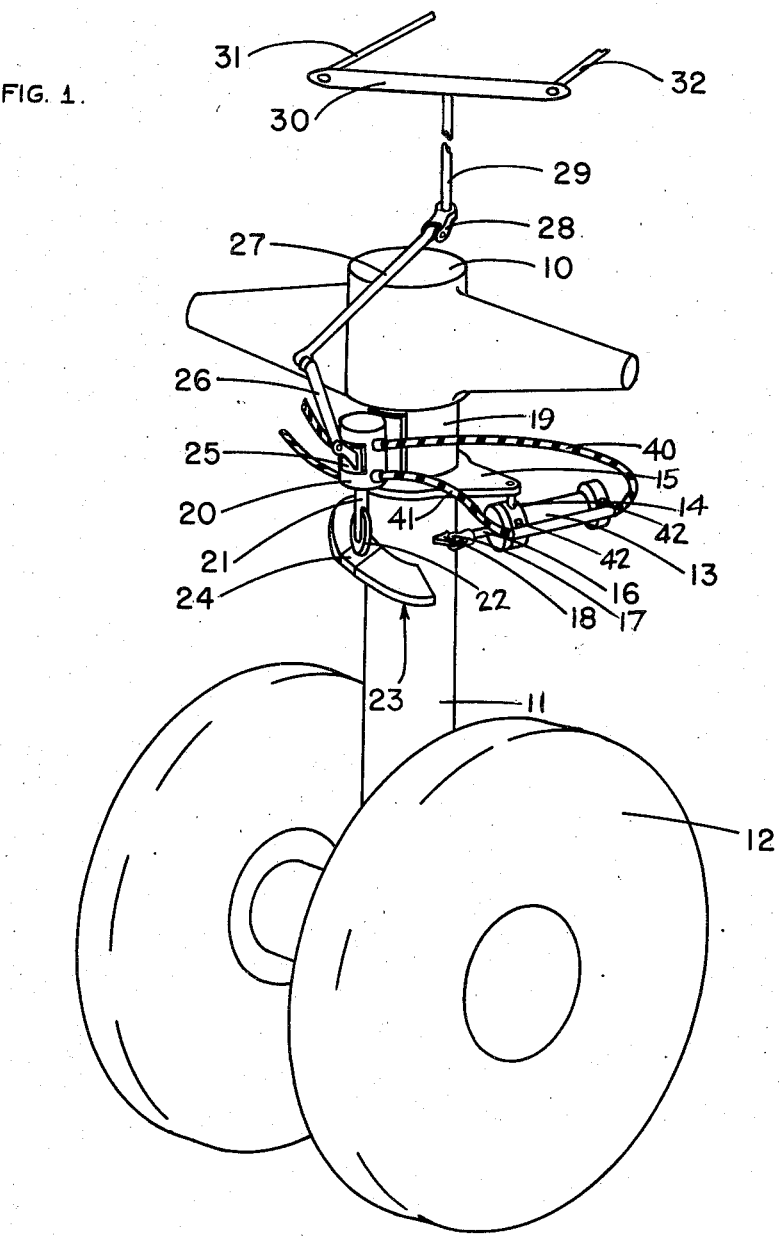
Figure 1 is a three-quarter front isometric view of an airplane nosewheel landing gear assembly embodying the invention.

Referring to Figure 1 of the drawings, the aircraft nosewheel landing gear assembly illustrated includes a strut supporting trunnion 10, which is adapted to be supported from the aircraft structure; a shock strut 11 turnable about its own longitudinal axis and carried by the trunnion 10; and a wheel assembly 12 carried by the lower end of the strut 11. These parts are conventional and no description of the details of construction is necessary The illustrated embodiment of the invention includes a conventional piston type reversible fluid motor 13, the cylinder of which is pivotally mounted at 14 on a supporting bracket 15, which is rigidly mounted on the depending cylindrical portion of the trunnion 10. The free end of the motor piston rod 16 is pivotally attached at 17 to a projecting lever arm 18, which is rigidly attached to the turnable strut 11, whereby when the motor piston moves in either direction from the central or neutral position in its cylinder, the piston rod forces the strut to turn the wheel assembly away from its central or neutral position with respect to the centerline of the airplane. It will be understood that the same result may be accomplished by providing two oppositely positioned lever arms 18, and by using two single acting piston motors instead of one double acting motor, as shown.

A valve supporting collar 19 is rotatably mounted on the cylindrical depending portion of the trunnion 10 adjacent the upper end of the strut 11. This collar carries a suitably mounted fluid flow control valve 20, which in this case is of the type having a reciprocable valve operating element 21, which is spring pressed toward the outward limit of its travel. The valve is so mounted that its operating element reciprocates in a plane parallel to the longitudinal axis of the strut 11. On the outer end of the valve operating element 21, a suitable roller 22 is mounted to roll on and cooperate with a cam 23 rigidly mounted on the strut 11. This cam is substantially helical, but is preferably provided with a short flat dwell section 24, midway between its helical sections, as shown.

As a means of bodily moving the valve 20 with respect to the cam 23 from a remote point, there is provided a scissors type linkage made up of a valve mounted bracket 25, and links 26, 27, and 28, the latter one of which is rigidly attached to a shaft 29 which may extend to a point near the pilot's cabin in the airplane, and be operated by a cross arm 30, and cables 31 and 32 connected either to the conventional rudder pedals or to a wheel type steering control mechanism.

Referring now to Figure 2, the hydraulic circuit will now be described. It includes a pump 33 or other suitable source of fluid pressure connected by a conduit 34 to the inlet 35 of the valve 20. A conventional accumulator 36 is preferably provided, and if used is in open communication with this conduit 34. A shut-off valve 37 is also provided in this conduit to shut off pump pressure from the entire hydraulic system to permit the nosewheel assembly to swivel freely and to thus be steered by means of the main landing wheel brakes, if desired.

The valve body has two fluid pressure outlets 38 and 39 which are respectively in communication with the opposite ends of the fluid motor through conduits 40 and 41. In each of these conduits is a check valve, indicated at 42, the details of which are not shown because it is of well known construction. It is of the type which is spring biased to a normally open position permitting a steady flow of fluid through the conduit in either direction. Any sudden rush of fluid from the fluid motor toward the flow control valve, however, instantly closes these check valves. Thus when the nosewheel starts to shimmy the motor piston begins to reciprocate rapidly. The check valves close against the resulting rush of fluid and trap fluid on both sides of the piston, thus stopping the shimmy before the vibration becomes serious.

A return outlet 43 of the valve 20 is connected by a conduit 44 to a reservoir 45, and the reservoir is connected to the pump by a conduit 46. A pop-off valve 47 in the conduit 44 is set to maintain a back pressure of 75 to 100 p. s. i. against the interior of the valve, and hence against the opposite sides of the motor piston when the valve stem or valve operating element 21 is in neutral position as shown in Figure 2. This back pressure is provided to prevent cavitation of the motor piston in case either of the valves 42 become disabled and incapable of preventing shimmy of the nosewheel.

*Operation*

Again referring to Figure 2, the entire system is shown in balanced condition. The nosewheel assembly will be understood to be aligned with the center line of the airplane, the cam 23 is centered with relation to the valve operating element 21, the valve operating element is centered in the valve, and the valve itself is centered with respect to its permitted bodily movement by the remote manual control. With all parts in this condition the valve operating element 21 blocks the flow of pressure fluid into or through the valve, but affords free communication between the opposite ends of the fluid motor through a port 48, and between the motor and the return conduit 44, with a back pressure being held on the fluid within the valve and motor by means of the pop-off valve 47, as previously explained.

If the pilot moves his manual control for a right turn, the valve 20 and its supporting collar are moved bodily to the right in an arcuate path through the linkage 25–32 inclusive. This movement causes the roller 22 to roll upward on the cam 23, and the cam in turn forces the valve operating element to move toward the position shown in Figure 3, during which movement it connects the fluid pressure source 33 with motor chamber 49, and connects the motor chamber 50 with the return line 44. The motor piston 51 is thus forced in a direction to turn the strut 11 and its wheel assembly toward the right. This movement begins almost simultaneously with the pilot's movement of the manual steering control. After the bodily movement of the valve 20 has ceased, the strut 11 and its cam continue to turn to the right until the roller 22 reaches the flat portion 24 of the cam, at which time the valve operating element has again reached neutral position, as in Figure 2. The actual lag between the turning movement of the valve and of the strut is approximately 3 degrees.

The reverse turning movement is illustrated in Figure 4. The manual control has been turned to the left. The valve 23 has consequently moved arcuately to the left, and the roller 22 has rolled downward on the cam 23. The valve operating element 21 is thus allowed to move toward its Figure 4 position under the influence of a spring 52, as previously mentioned. Immediately following the start of this movement, fluid pressure is connected to motor chamber 50, and motor chamber 49 is connected to fluid return line 44 through the port 48. The piston 51 is thus moved in a direction to force the strut 11 to turn to the left. When the strut 11 has turned sufficiently with relation to the valve to again bring the flat portion 24 of the cam beneath the valve operating element, fluid flow is stopped, and all relative movement of the various parts ceases.

In considering the described operation it should be noted that the turning movement imparted hydraulically to the strut 11 is directly proportional to the turning movement of the valve 20, which is directly controlled by the pilot. If he moves his manual controls sufficiently to move the valve through an arc of 15°, then the strut and its wheel assembly is turned through an arc of 15° in the same direction.

While only one embodiment of the invention has been illustrated, and that embodiment as applied to the turning control of an airplane nosewheel, it will be obvious to those familiar with the art that the inventive idea may be embodied in other forms, and may be employed to perform other operations equally as well. It is aimed that the appended claims will protect other embodiments than the one illustrated.

Having described the construction and operation of one embodiment of the invention with sufficient clarity to enable others to construct and use it, I claim:

1. In an aircraft landing gear in which a structure mounted support carries a landing strut which is rotatable about its own longitudinal axis, and the strut carries a ground engaging wheel assembly for steering the aircraft in response to controlled movement of the strut, a hydraulic steering system for the strut comprising: A structure supported reversible fluid motor operatively connected to exert opposed torques on said strut in response to fluid pressures applied to the motor piston; a fluid flow control valve mounted to move in an arcuate path adjacent the periphery of the strut, and having a pair of outlets in fluid communication with the opposite ends of said fluid motor; a fluid pressure source in communication with the control valve inlet; a valve operating element; a cam fixed on the strut and cooperating with said valve operating element to vary the latter's position when the entire valve is moved in its arcuate path; and control means for bodily moving the valve in opposite directions with respect to a neutral position.

2. In an aircraft landing gear in which a structure mounted support carries a landing strut which is rotatable about its own longitudinal axis, and the strut carries a ground engaging wheel assembly for steering the aircraft in response to controlled movement of the strut, a hydraulic steering system for the strut comprising: A structure supported reversible fluid motor operatively connected to exert opposed torques on said strut in response to fluid pressures applied to the motor piston; a fluid flow control valve mounted for controlled bodily movement in a path adjacent the strut, and having a pair of outlets in fluid communication with the opposite ends of said fluid motor; a fluid pressure source in communication with the control valve inlet; a valve operating element; a cam fixed on the strut and cooperating with the valve operating element to maintain it in neutral position when the strut is in neutral position, and to vary the position of the valve operating element as a result of relative movement between the valve and the strut; and control means for bodily moving the valve in opposite directions with respect to a neutral position.

3. In an aircraft landing gear in which a structure mounted support carries a landing strut which is rotatable about its own longitudinal axis, and the strut carries a ground engaging wheel assembly for steering the aircraft in response to controlled movement of the strut, a hydraulic steering and anti-shimmy system for the strut comprising: A structure supported reversible fluid motor operatively connected to exert opposed torques on said strut in response to fluid pressures applied to its piston; a fluid pressure control valve mounted to move in an arcuate path adjacent the periphery of the strut, and having a pair of outlets; conduits connecting said outlets with the opposite ends of the fluid motor; valve means disposed in each of said conduits to prevent the higher rates of fluid flow from the motor to the control valve which are normally initiated by uncontrolled high frequency oscillations on the part of the strut; a fluid pressure source in communication with the control valve inlet; a valve operating element; a cam fixed on the strut and cooperating with said valve operating element to vary the latter's position as a result of relative movement between the valve and the strut; and control means for bodily moving the valve in opposite directions with respect to a neutral position, and with respect to said cam.

4. In an aircraft landing gear in which a structure mounted support carries a landing strut which is rotatable about its own longitudinal axis, and the strut carries a ground engaging wheel assembly for steering the aircraft in response to controlled movement of the strut, a hydraulic steering system for the strut comprising: a structure supported piston type reversible fluid motor operatively connected to exert opposed torques on said strut in response to fluid pressure applied to the motor piston; a fluid pressure source in closed communication with said motor; a fluid flow control valve between said pressure source and said motor for controlling the flow of fluid to and from said motor; an arcuate cam mounted concentrically on and to move with the rotatable strut; means for mounting the valve on the structure for independent bodily movement in an arc concentric with the strut and of substantially the same radius and immediately adjacent said cam; a valve element spring pressed into cooperating contact with said cam; and operator controlled means for moving said valve bodily in either direction with relation to said strut and its cam, whereby the valve element moves in either of two directions depending on the relative direction of movement between the valve body and the cam.

ROBERT V. CORNS.

REFERENCES CITED

The following references are of record in the file of this patent:

UNITED STATES PATENTS

| Number | Name | Date |
|---|---|---|
| 2,159,142 | Fischer | May 23, 1939 |
| 2,221,150 | Rebeski | Nov. 12, 1940 |
| 2,261,444 | Neubert | Nov. 4, 1941 |
| 2,395,671 | Kleinhans | Feb. 26, 1946 |
| 2,418,325 | Wassall | Apr. 1, 1947 |
| 2,424,244 | Greenough | July 22, 1947 |

FOREIGN PATENTS

| Number | Country | Date |
|---|---|---|
| 5,430 | Great Britain | of 1896 |